United States Patent
Knechtges et al.

(10) Patent No.: US 9,156,459 B2
(45) Date of Patent: Oct. 13, 2015

(54) VEHICLE BRAKE SYSTEM FOR A MOTOR VEHICLE AND METHOD FOR ACTUATING THE VEHICLE BRAKE SYSTEM

(75) Inventors: Josef Knechtges, Mayen (DE); Michael Schog, Mertloch (DE)

(73) Assignee: Lucas Automotive GmbH, Koblenz (DE)

( * ) Notice: Subject to any disclaimer, the term of this patent is extended or adjusted under 35 U.S.C. 154(b) by 212 days.

(21) Appl. No.: 13/813,311

(22) PCT Filed: Jun. 30, 2011

(86) PCT No.: PCT/EP2011/003247
§ 371 (c)(1),
(2), (4) Date: Mar. 21, 2013

(87) PCT Pub. No.: WO2012/016612
PCT Pub. Date: Feb. 9, 2012

(65) Prior Publication Data
US 2014/0144731 A1    May 29, 2014

(30) Foreign Application Priority Data
Aug. 3, 2010   (DE) .......................... 10 2010 033 254

(51) Int. Cl.
*B60T 13/58* (2006.01)
*B60T 7/04* (2006.01)
(Continued)

(52) U.S. Cl.
CPC ............... *B60T 13/588* (2013.01); *B60T 7/042* (2013.01); *B60T 7/107* (2013.01); *B60T 7/122* (2013.01);
(Continued)

(58) Field of Classification Search
CPC ......... B60T 7/042; B60T 7/107; B60T 7/122; B60T 8/32; B60T 8/4372; B60T 13/146; B60T 13/662; B60T 13/741; B60T 13/588; F16D 65/18; F16D 2123/00; F16D 2121/04; F16D 2121/24
USPC .......... 303/15, 16, 3, 20, 116.1, 119.1, 113.2, 303/113.4; 188/72.3, 156
See application file for complete search history.

(56) References Cited

U.S. PATENT DOCUMENTS 6,000,507 A * 12/1999 Bohm et al. ................... 188/158
6,394,235 B1   5/2002 Poertzgen et al.
(Continued)

FOREIGN PATENT DOCUMENTS

DE       19732168 C1    1/1999
DE       10228115 A1    1/2004
(Continued)

*Primary Examiner* — Thomas J Williams
*Assistant Examiner* — Mariano Sy
(74) *Attorney, Agent, or Firm* — MacMillan, Sobanski & Todd, LLC

(57) ABSTRACT

A vehicle brake system having a hydraulically actuatable disc brake device which has an electromechanical operating device for activating a parking brake function, wherein the vehicle brake system has a hydraulic circuit with a hydraulic pressure source and also has activatable hydraulic functional elements in order to hydraulically actuate the disc brake device in accordance with a service braking action by a driver or an automatic activation, wherein the vehicle brake system also has a control device in order to actuate the electromechanical operating device in accordance with a parking braking action by the driver or an automatic activation of the parking brake function. Here, to avoid residual slippage torques, it is provided that the hydraulic circuit can be actuated by the control device such that, upon the triggering of the parking brake function through actuation of the electromechanical operating device, a hydraulic pressure is built up in the disc brake device, which hydraulic pressure is large enough to elastically deform hydraulic seal elements in the disc brake device corresponding to an elastic deformation during a service braking operation.

10 Claims, 5 Drawing Sheets

(51) Int. Cl.
  *B60T 7/10* (2006.01)
  *B60T 7/12* (2006.01)
  *B60T 8/32* (2006.01)
  *B60T 8/48* (2006.01)
  *B60T 13/14* (2006.01)
  *B60T 13/66* (2006.01)
  *B60T 13/74* (2006.01)
  *F16D 65/18* (2006.01)
  *F16D 121/04* (2012.01)
  *F16D 121/24* (2012.01)
  *F16D 123/00* (2012.01)

(52) U.S. Cl.
  CPC ............... *B60T 8/32* (2013.01); *B60T 8/4872* (2013.01); *B60T 13/146* (2013.01); *B60T 13/662* (2013.01); *B60T 13/741* (2013.01); *F16D 65/18* (2013.01); *F16D 2121/04* (2013.01); *F16D 2121/24* (2013.01); *F16D 2123/00* (2013.01)

(56) References Cited

U.S. PATENT DOCUMENTS

| | | | |
|---|---|---|---|
| 7,744,166 B2 * | 6/2010 | Leiter et al. | 303/20 |
| 7,753,178 B2 | 7/2010 | Ohtani et al. | |
| 8,322,495 B2 | 12/2012 | Leiter et al. | |
| 8,448,756 B2 * | 5/2013 | Knechtges | 188/72.8 |
| 8,494,745 B2 * | 7/2013 | Schneider et al. | 701/70 |
| 2002/0063022 A1 | 5/2002 | Shaw et al. | |
| 2008/0053760 A1 | 3/2008 | Oikawa et al. | |
| 2011/0144878 A1 * | 6/2011 | Schneider et al. | 701/70 |

FOREIGN PATENT DOCUMENTS

| | | |
|---|---|---|
| DE | 102005042282 A1 | 3/2007 |
| DE | 102005051082 A1 | 5/2007 |
| DE | 102006056346 A1 | 6/2007 |
| DE | 102007041162 A1 | 3/2008 |
| DE | 102007043596 A1 | 5/2008 |

* cited by examiner

VEHICLE BRAKE SYSTEM FOR A MOTOR VEHICLE AND METHOD FOR ACTUATING THE VEHICLE BRAKE SYSTEM

CROSS-REFERENCE TO RELATED APPLICATIONS

This application is a national stage of International Application No. PCT/EP2011/003247 filed Jun. 30, 2011, the disclosures of which are incorporated herein by reference in entirety, and which claimed priority to German Patent Application No. DE 10 2010 033 254.2 filed Aug. 3, 2010, the disclosures of which are incorporated herein by reference in entirety.

BACKGROUND OF THE INVENTION

The present invention relates to a vehicle braking system with a hydraulically controllable disc-brake device which exhibits an electromechanical actuating device for activating a parking-brake function, the vehicle braking system exhibiting a hydraulic circuit with a hydraulic pressure source and also with controllable hydraulic functional elements, in order to control the disc-brake device hydraulically in accordance with a service-braking action of a driver or in accordance with an automatic activation, the vehicle braking system further exhibiting a control device, in order to control the electromechanical actuating device in accordance with a parking-brake action of the driver or in accordance with an automatic activation of the parking-brake function. The invention further relates to a method for controlling a vehicle braking system of the type described above.

Vehicle braking systems are known from the state of the art in diverse forms. In concrete terms, document DE 10 2005 051 082 A1, and corresponding U.S. Pat. No. 8,322,495 B2, both of which are incorporated by reference herein in entirety, describes a vehicle braking system with a disc brake that has been constructed as a floating-calliper disc brake. In this case, a friction-lining arrangement with two opposing friction linings has been provided on both sides of a brake disc. The one brake lining has been fitted to a floating calliper, whereas the other brake lining can be displaced hydraulically relative to the floating calliper via an actuating piston. As a result of a hydraulic pressurisation of an actuating piston, the movable brake lining is displaced towards the brake disc. The brake lining that is fixed to the floating calliper is pulled from the other side against the brake disc in known manner with the aid of the floating-calliper function, so that a braking force acts on the brake disc from both sides. But, in addition to this floating-calliper function which has long been known, this state of the art also provides an electromechanical actuating device. The latter is used in order to realise a parking-brake function. Given appropriate control, in addition to the hydraulic displacement it is also possible for the disc brake to be actuated electromechanically. But it has been shown that in the case of such a combination of a hydraulically and electromechanically actuatable brake residual slippage torques may remain in the system after the disengagement procedure as a result of an electromechanical actuation that has taken place previously, which torques have to be suppressed by means of elaborate separate measures. This is due to the fact that the conventional 'rollback function' of a disc-brake arrangement of such a type, which prevents residual slippage torques after a hydraulic actuation, cannot be fully exhausted in the case of the electromechanical actuation, on account of the lack of application of hydraulic pressure. By the term 'rollback function', one understands the effect of an elastically deformed hydraulic seal which in the housing is ordinarily received in a receiving groove and which by means of its inner surface is in adhering contact with the surface of the actuating piston, whereby this adhering contact firstly prevents a slipping of the hydraulic seal on the surface of the actuating piston during an actuating movement relative to the housing. As a result, the hydraulic seal which is retained in the housing of the receiving groove there undergoes in the course of this movement an elastic deformation which after reduction of the actuating force can elastically relax back into its initial state and in the process pulls the brake piston back into an initial position which is largely ineffectual in terms of braking action. The deformability of the hydraulic seal—that is to say, its capacity to follow a movement of the actuating piston by means of an elastic deformation—is decisively limited by the holding forces determining the adhering contact. In the course of the elastic deformation this means that as soon as the constantly rising forces, counteracting the movement of the actuating piston, exceed the holding forces of the adhering contact the hydraulic seal slides on the surface of the actuating piston. The region of application of the hydraulic seal on the actuating piston changes as a result, and the actuating piston slides through under the hydraulic seal. It is furthermore to be taken into consideration that the pressure fed in during a hydraulic actuation increases the normal force with which the hydraulic seal is pressed against the surface of the actuating piston, by reason of the elastic deformation of the hydraulic seal that is caused thereby, as a result of which the holding forces of the adhering contact increase to the same degree in comparison with an electromechanical actuation without supply of a hydraulic pressure. The lack of pressure-induced deformation and the correspondingly smaller holding forces may in the case of an electromechanical actuation have the result that in the case of an equally large movement of the actuating piston the adhering contact breaks off before reaching the end position of the actuating piston, on account of the absence of the increase in normal force. As a result, in comparison with a hydraulic pressurisation the rollback function as described above cannot be fully exhausted. This may result in undesirable residual slippage torques.

BRIEF SUMMARY OF THE INVENTION

It is a feature of the present invention to provide a disc-brake device of the type indicated at the outset, wherein residual slippage torques can be largely suppressed in any operating mode, in order thereby to improve the functionality in straightforward manner with low production costs.

This features achieved by means of a disc brake of the type indicated at the outset, wherein there is provision that the hydraulic circuit is controllable via the control device in such a manner that when the parking-brake function is disengaged a hydraulic pressure that is of sufficient magnitude to deform hydraulic sealing elements in the disc-brake device in a manner corresponding to an elastic deformation during a service braking is built up in the disc-brake device by controlling the electromechanical actuating device.

So, in accordance with the invention, after a parking-brake function, induced by the driver or activated automatically, a hydraulic actuation of the disc-brake device is simulated. This has the result that, under the hydraulic pressure that has been built up, the hydraulic sealing elements in the disc-brake device are elastically deformed in such a manner as is ordinarily the case during a hydraulic service braking. After the disengaging of the electromechanical parking brake as a result of a subsequent reduction of the hydraulic pressure this elastic deformation then ensures, by reason of the rollback function occurring, that during the elastic relaxation of the hydraulic sealing elements the actuating piston is pulled back in conventional manner into its initial position in which the brake linings are still abutting the brake disc and accordingly residual slippage torques might arise.

A further development of the invention provides that the disc-brake device includes an actuating piston which is displaceably guided in a disc-brake housing, whereby a hydraulic seal which is elastically deformable in predetermined manner in accordance with the applied hydraulic pressure has been provided between the actuating piston and the disc-brake housing.

Furthermore, in accordance with the invention there may be provision that the hydraulic circuit includes a plurality of controllable valves in order to build up hydraulic pressure optionally in individual disc-brake devices of the vehicle braking system. Ordinarily, the valves are controlled within the scope of a service braking in accordance with the specifications of a slip-regulating system. In this context there may be provision, in accordance with the invention, that the valves are controllable via the control device in such a manner that only in those disc-brake devices of the vehicle braking system which have been constructed with a mechanical actuating device is hydraulic pressure built up when the parking-brake function is disengaged. These are, as a rule, the disc-brake devices on the rear wheels.

In individual cases it is possible that, before disengaging the parking-brake function, the driver has already initiated a service braking by actuating the brake pedal, or said service braking was activated automatically by a driving-assistance system (e.g. hill hold with hill-ascent assist or hill-descent assist) or a security system (e.g. ESP) etc. In this connection, hydraulic fluid is already supplied to the individual disc brakes, and the latter are hydraulically preloaded correspondingly. In such a situation it is not necessary to convey hydraulic fluid to the disc-brake devices additionally for the purpose of build-up of pressure and for the purpose of simulating the service braking. For this reason, a further development of the invention provides that the control device registers, prior to building up the hydraulic pressure, whether a service-braking action by the driver or an automatic activation of the braking system obtains when the parking-brake function is disengaged. In this connection there may, in particular, be provision that the control device registers the existence of a service-braking action by the driver, or of an automatic activation, on the basis of available parameters, in particular on the basis of the present switching state of a brake-light switch, on the basis of the hydraulic pressure in a master brake cylinder, or on the basis of the pedal travel of a brake pedal.

The invention further relates to a method for actuating a vehicle braking system of the type described above, comprising the following steps:
registering a driver action for the purpose of disengaging the parking-brake function, or registering an automatic disengagement of the parking-brake function of a disc-brake device,
registering the hydraulic pressure in the disc-brake device,
activating the electromechanical actuating device for the purpose of disengaging the parking-brake function,
building up a hydraulic pressure of the disc-brake device for the purpose of deforming its hydraulic seal arrangement, and
lowering the hydraulic pressure.

In this connection there may be provision that the hydraulic pressure that is generated lies maximally within the range from 20 bar to 40 bar. Furthermore, in accordance with the invention it is possible that for the purpose of generating the hydraulic pressure either a pump of the vehicle braking system is activated or the hydraulic pressure available in the braking system is used.

Other advantages of this invention will become apparent to those skilled in the art from the following detailed description of the preferred embodiments, when read in light of the accompanying drawings.

DETAILED DESCRIPTION OF THE INVENTION

Figure 1:
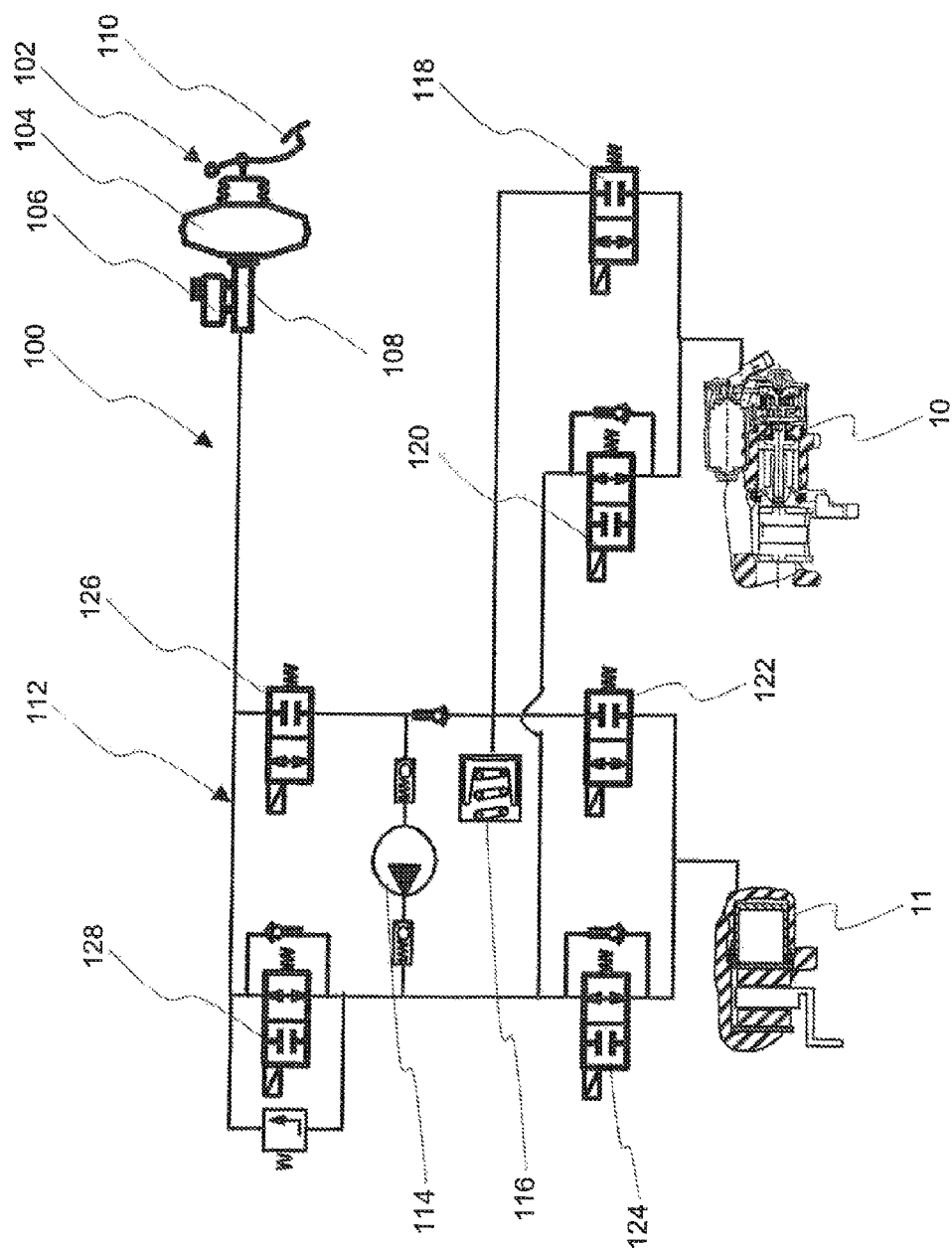
FIG. 1 is a circuit diagram of a vehicle braking system according to the invention, wherein a disc-brake device for a front wheel and a disc-brake device for a rear wheel are shown schematically.

In FIG. 1 a circuit diagram of a vehicle braking system 100 according to the invention is shown schematically. The system includes a pressure source 102 which has been designed with a brake booster 104, a reservoir 106, a master brake cylinder 108 and a brake pedal 110 which is capable of being actuated by the driver. The pressure source 102 is hydraulically coupled with a hydraulic brake circuit 112. The latter exhibits a motor-driven pump 114 and also a pressure accumulator 116. Furthermore, two disc-brake devices, namely a disc-brake device 10 for a rear wheel and a disc-brake device 11 for a front wheel, can be discerned.

Assigned to the disc-brake devices 10, 11 are valves 118, 120, 122, 124 which are each controllable via a control device which is not shown. Furthermore, valves 126 and 128 can be discerned which make it possible to decouple the hydraulic brake circuit 112 hydraulically from the pressure source 102 which is capable of being actuated by the driver. With regard to the service-brake function, the vehicle braking system 100 shown schematically operates in a manner known as such. The control device, which is not shown, further offers a slip-regulating function, in order to be able to implement anti-lock braking systems (ABS), traction control systems (ASR), dynamic drive control systems (ESP) and also automatic braking operations, for example for an adaptive cruise control (ACC).

In the following the structure of the disc-brake device 10 at the rear wheel will be considered in detail with a view to better comprehension.

Figure 2:
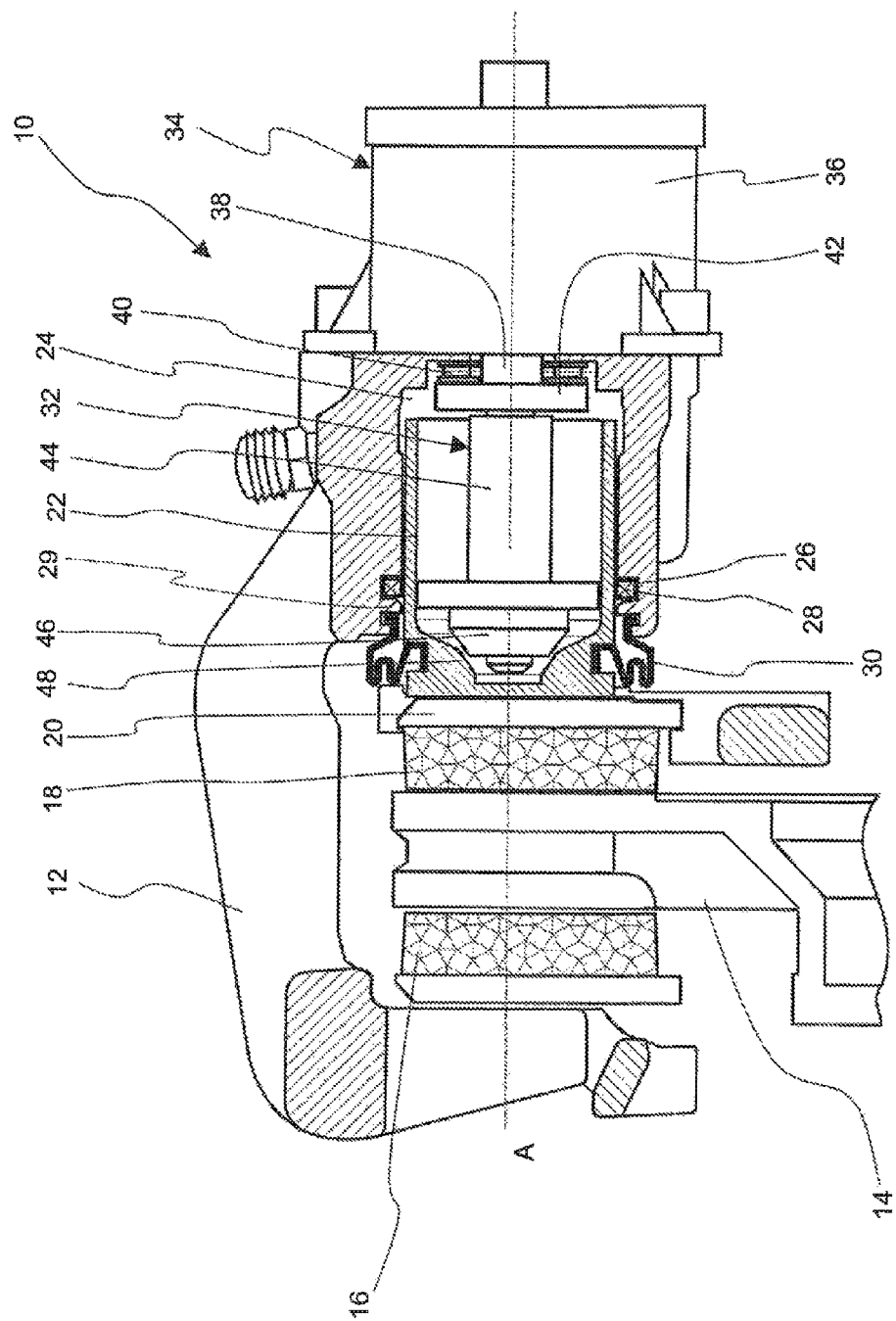
FIG. 2 is a partially sectioned detailed view of the disc-brake device for the rear wheel according to FIG. 1 with corresponding parking-brake device.

In FIG. 2 the disc-brake device 10 according to the invention is represented in a partial sectional view. Said device includes a brake calliper 12, supported in floating manner in the usual way via a brake bracket which is not shown, which spans a brake disc 14 coupled in torsionally resistant manner to a vehicle wheel. In the brake calliper 12 a brake-lining arrangement is provided which exhibits a brake lining 16 abutting the brake calliper 12 and a brake lining 18 abutting an actuating piston 22. The two brake linings 16 and 18 face one another, and in the disengaging position shown in FIG. 2 have been arranged with slight clearance on both sides of the brake disc 14, so that no appreciable residual slippage torques arise. The movable brake lining 18 has been arranged on an actuating piston 22 via a brake-lining bracket 20 for common movement. The actuating piston 22 is displaceably supported in a cylindrical cavity 24 in the brake calliper 12. In the region of this cavity 24 close to the brake disc a circumferential receiving groove 26 is provided, in which an annular sealing element 28 is received. The sealing element 28 has the property that it deforms in the presence of applied hydraulic pressure within the conventional operating range of the disc-brake arrangement 10. This will be described in detail below with reference to FIGS. 4 and 5.

It can further be discerned that the actuating piston 22 has been provided at its end facing towards the brake disc 14, on the left in FIG. 2, with a circumferential bellows 30 which prevents dirt from penetrating into the region between the actuating piston 22 and the circumferential wall defining the receiving cavity 24 of the brake calliper 12.

In FIG. 2 it can further be discerned that the actuating piston 22 is of hollow design. In said piston a pressure piece 32 of an electromechanical actuating arrangement 34 is received. The electromechanical actuating arrangement 34 includes a propulsion assembly 36 with an electric motor and with a gearing arrangement. An output shaft 38 of this propulsion assembly 36 propels a propulsion spindle 42 supported via a thrust bearing 40, which is received by thread engagement in a threaded receptacle 44 of the pressure piece 32.

The pressure piece 32 exhibits in its region facing towards the brake disc 14, on the left in FIG. 2, a conical portion 46 which is capable of being brought into abutment with a complementary conical inner surface 48 of the actuating piston 22. In the disengaging position shown in FIG. 2 there is a clearance between the two conical surfaces 46 and 48.

Now if the brake is hydraulically actuated by the driver via the brake pedal, or automatically via a driving-assistance system (e.g. ACC or hill hold with hill-ascent or hill-descent assist) or a security system (e.g. ESP), in the cavity 24 a hydraulic pressure is built up in a manner known as such, so that the actuating piston 22 is displaced to the left along the longitudinal axis A in FIG. 1. Consequently, with the calliper arrangement the brake lining 18 is pressed onto the brake disc 14 in a manner known as such and in the process the brake lining 16 is pulled against the brake disc by corresponding displacement of the brake calliper 12 on the other side of the brake disc 14.

By virtue of the pressurisation of the interior space 24 with pressurised hydraulic fluid, the actuating piston 22 in FIG. 2 is displaced to the left along the longitudinal axis A. The radially outer sealing element 28, which is represented in FIG. 4 in the relaxed state, is elastically deformed into the region of a bevelled recess 29, as shown in FIG. 5, under the applied pressure and by virtue of the movement of the actuating piston 22 corresponding to arrow P1.

Figure 4:
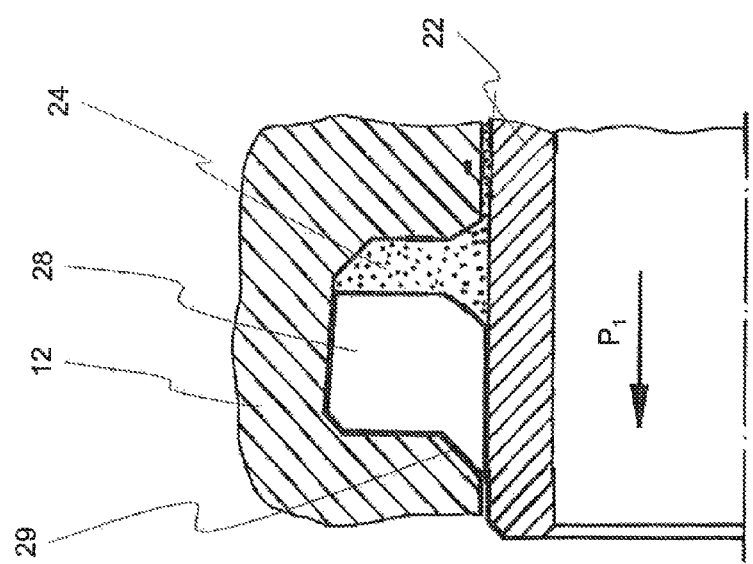
FIG. 4 is a detailed view of a hydraulic sealing element in the pressureless state.
Figure 5:
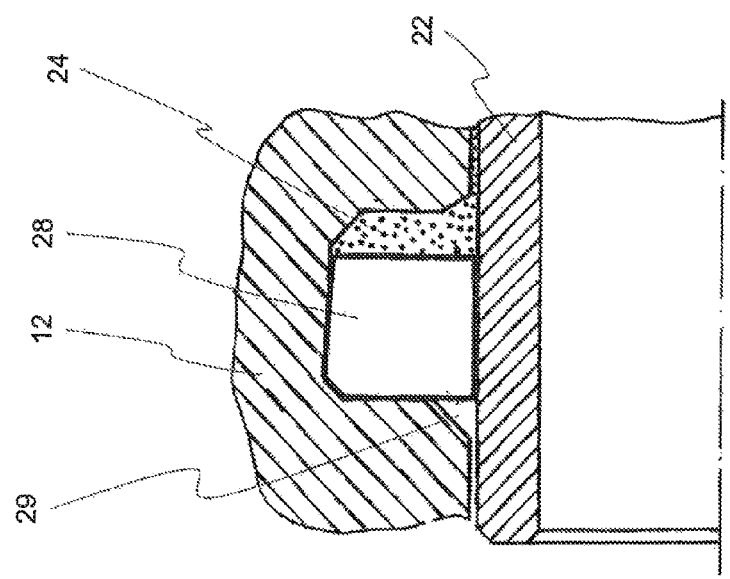
FIG. 5 is a detailed view of the hydraulic sealing element in the elastically deformed state as a result of an application of pressure.

If now, for example by releasing the brake pedal or deactivating the driving-assistance system or security system, the hydraulic pressure in the interior space 24 of the brake calliper 12 is reduced, the sealing element 28 can elastically relax again and takes its initial shape according to FIGS. 2 and 4. This means that within the scope of its elastic relaxation it pulls the actuating piston 22 back again out of the actuating position shown in FIG. 5 by reason of the mutual frictional abutment, and in this way places the disc-brake device in its initial state. This corresponds to the rollback function, known as such, which is achieved in conventional brakes via the outer seal 28 on the outer circumference of the actuating piston 22.

For the purpose of activating the parking brake, in accordance with the invention either firstly the actuating piston 22 is displaced into a brake-active position, similar to an activation of the service brake, by applying a hydraulic pressure, and then the electromechanical actuating device 34 is activated so that the pressure piece 32 is displaced forwards until the clearance has been depleted and the conical surface 46 abuts the corresponding conical surface 48 in the interior of the actuating piston 22. As a result, it can be ensured that the actuating piston 22 is axially supported on the housing of the brake calliper 12 via the pressure piece 32 and the thrust bearing 40. Once the parking-brake state has been attained, the hydraulic pressure in the cavity 24 can be reduced again. Given sufficiently powerful design of the electromechanical actuating device 34, the hydraulic preloading may also be omitted, so that the activation of the parking brake is effected solely by the electromechanical actuating device 34.

The parking-brake state is maintained by reason of the position of the pressure piece 32 and the self-retention (for example, by virtue of a self-locking gearing between the spindle 42 and the receptacle 44). The brake linings 16, 18 pressing against the brake disc 14 are supported via the pressure piece 32.

Now if the parking-brake state is to be disengaged again, the problem elucidated at the outset in relation to the state of the art may exist, namely that the seal 28 has already relaxed back in the state according to FIG. 4 or, as a result of a purely electromechanical activation of the parking brake, has not actually been deformed in accordance with FIG. 5. The rollback function that is available by virtue of this elastically deformed state according to FIG. 5, in the case of which the actuating piston 22 is pulled back as a result of the elastic relaxation of the seal 28, therefore cannot occur. The actuating piston 22 would accordingly remain in an advanced position for lack of retractile action (rollback function), which may result in wear-increasing residual slippage torques.

Figure 3:
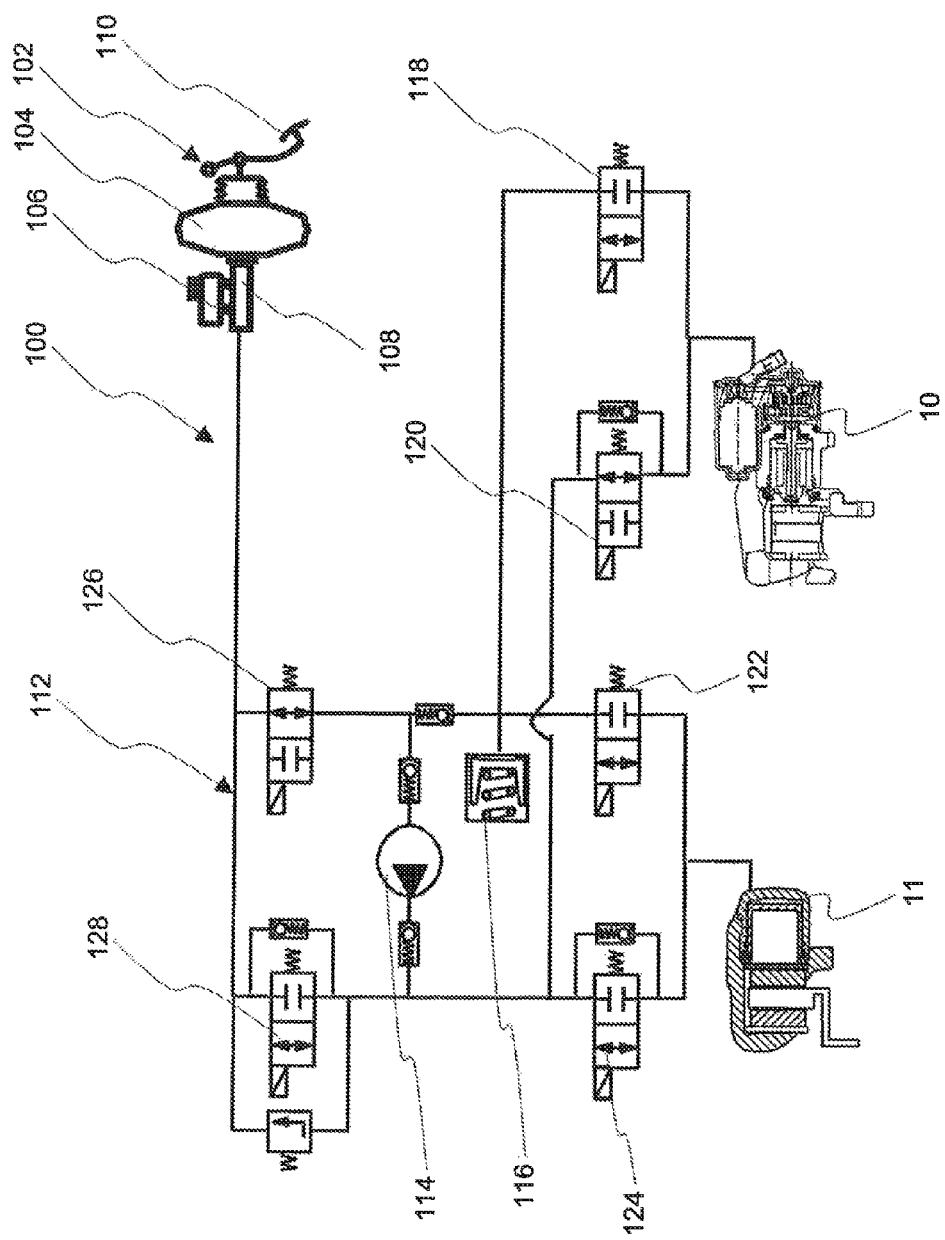
FIG. 3 is the circuit diagram according to FIG. 1 in the case of a control operation for the purpose of disengaging the parking-brake function.

In order to avoid this, pressurised hydraulic fluid is introduced into the cavity 24 when the parking-brake function is disengaged. This is done by appropriate control of the valves, as shown in FIG. 3.

Valve 126 (TC supply) is opened in comparison with the initial position according to FIG. 1. Valve 128 (TC iso), on the other hand, is closed. As a result, by means of the pump 114 the hydraulic fluid located in the hydraulic system can be pressurised. As a result, hydraulic pressure can be built up in the cavity 24 of brake 10 which was elucidated above in detail with reference to FIG. 2 and which has been equipped with an electromechanically actuatable parking brake. Brake 11, on the other hand, can be decoupled from this application of pressure by valve 124 (ABS iso) being closed.

The entire hydraulic fluid available in the hydraulic brake circuit is accordingly supplied to the disc-brake devices 10 at the rear wheels (only one device shown).

Figure 6:
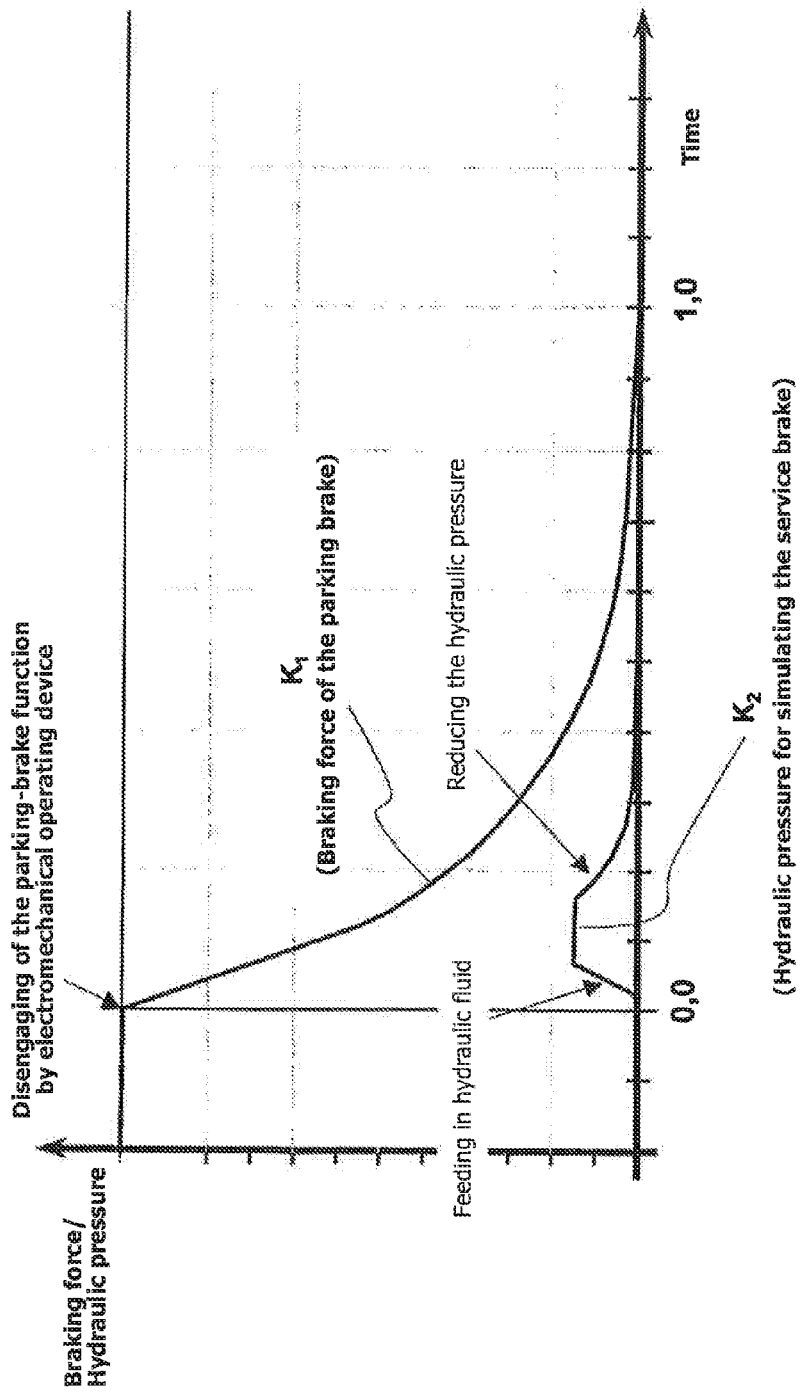
FIG. 6 is a diagram for elucidating the mode of operation of the invention.

This procedure will be elucidated in detail with reference to FIG. 6. At time 0 the braking force that is applied by the parking-brake function is reduced, by the electromechanical actuating device 34 being controlled in accordance with curve $K_1$. In parallel, hydraulic pressure is fed into the cavity 24 in accordance with curve $K_2$, in order to deform the hydraulic seal 28 in accordance with FIG. 5. This means that a hydraulic actuation of disc-brake device 10 is simulated. After a certain period the hydraulic pressure is again reduced in accordance with curve $K_2$, so that when a sufficient clearance between the conical surfaces 46 and 48 obtains the actuating piston 22 can pull back in accordance with the elastic deformation of the sealing element 28 and in a manner corresponding to its rollback relaxation.

As a result, it is guaranteed that even in the case of a purely electromechanical activation of the parking-brake function when the parking-brake function is disengaged the actuating piston 22 is pulled back sufficiently far that residual slippage torques can be forestalled.

The invention accordingly offers, by suitable control of the hydraulic circuit which is already present anyway, the possibility to avoid residual slippage torques effectively in disc-brake devices of such a type by utilising the control device.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle braking system with a hydraulically controllable disc-brake device which exhibits an electromechanical actuating device for activating a parking-brake function, the vehicle braking system exhibiting a hydraulic circuit with a hydraulic pressure source and also with controllable hydraulic functional elements, in order to control the disc-brake device hydraulically in accordance with a service-braking action of a driver or in accordance with an automatic activation, the vehicle braking system further exhibiting a control device, in order to control the electromechanical actuating device in accordance with a parking-brake action of the driver or in accordance with an automatic activation of the parking brake,
wherein the hydraulic circuit is controllable via the control device in such a manner that when the parking-brake function is disengaged a hydraulic pressure is built up in the disc-brake device by the electromechanical actuating device being controlled, the hydraulic pressure being sufficiently large in order to deform elastically a hydraulic sealing element in the disc-brake device in accordance with an elastic deformation during a service braking operation, wherein the hydraulic pressure lies maximally within the range from 20 bar to 40 bar.

2. The vehicle braking system according to claim 1,
wherein the disc-brake device exhibits an actuating piston which is displaceably guided in a disc-brake housing, wherein between the actuating piston and the disc-brake housing the hydraulic sealing element has been provided which is elastically deformable in predetermined manner in accordance with the hydraulic pressure.

3. The vehicle braking system according to claim 1,
wherein the hydraulic circuit exhibits a plurality of controllable valves, in order to build up hydraulic pressure optionally in individual disc-brake devices of the vehicle braking system.

4. The vehicle braking system according to claim 3,
wherein the valves are controllable via the control device in such a manner that only in those disc-brake devices of the vehicle braking system which have been constructed with the electromechanical actuating device can hydraulic pressure be built up when the parking-brake function is disengaged.

5. The vehicle braking system according claim 1,
wherein the control device has been designed with a slip-regulating function.

6. The vehicle braking system according to claim 1,
wherein prior to building up the hydraulic pressure the control device registers whether a service-braking action by the driver or an automatic activation of the disc-brake device obtains when the parking-brake function is disengaged.

7. The vehicle braking system according to claim 6,
wherein the control device registers the existence of a service-braking action by the driver on the basis of available parameters.

8. The vehicle braking system according to claim 7,
wherein the parameters are on a basis of a present switching state of a brake-light switch, hydraulic pressure in a master brake cylinder, or pedal travel of a brake pedal.

9. A method for controlling a vehicle braking system according to claim 1, comprising the following steps:
registering a driver action for the purpose of disengaging the parking-brake function, or registering an automatic disengagement of the parking-brake function of a disc-brake device,
registering the hydraulic pressure in the disc-brake device,
activating the electromechanical actuating device for the purpose of disengaging the parking-brake function,
building up a hydraulic pressure in the disc-brake device for the purpose of deforming the hydraulic sealing element, wherein the hydraulic pressure lies maximally in the range from 20 bar to 40 bar, and
lowering the hydraulic pressure.

10. The method according to claim 9,
wherein for the purpose of generating the hydraulic pressure either a pump of the vehicle braking system is activated or the hydraulic pressure available in the braking system is used.

* * * * *